United States Patent
El-Assir et al.

(10) Patent No.: US 10,812,116 B1
(45) Date of Patent: Oct. 20, 2020

(54) SYSTEM FOR CALIBRATION OF A GLOBAL NAVIGATION SATELLITE SYSTEM SIMULATOR AS WELL AS METHOD OF CALIBRATING A GLOBAL NAVIGATION SATELLITE SYSTEM SIMULATOR

(71) Applicant: Rohde & Schwarz GmbH & Co. KG, Munich (DE)

(72) Inventors: Rachid El-Assir, Munich (DE); Nabil Ghanem, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 16/459,221

(22) Filed: Jul. 1, 2019

(51) Int. Cl.
*H04B 1/00* (2006.01)
*G01S 19/00* (2010.01)
*H04B 1/7087* (2011.01)
*H04B 1/405* (2015.01)

(52) U.S. Cl.
CPC ........... *H04B 1/0035* (2013.01); *H04B 1/405* (2013.01); *H04B 1/7087* (2013.01)

(58) Field of Classification Search
CPC ...... H04B 7/19; H04B 7/1851; H04B 7/2693; H04B 17/11; H04B 7/21; H04B 17/27; G01S 1/24; G01S 19/01; G01S 19/32; G01S 19/39; G01S 19/42
See application file for complete search history.

(56) References Cited

U.S. PATENT DOCUMENTS

| | | | |
|---|---|---|---|
| 7,826,994 B2 * | 11/2010 | Fu .................. | G01S 19/235 702/108 |
| 9,473,258 B2 * | 10/2016 | Pearse ............... | G01S 19/03 |
| 9,874,640 B2 * | 1/2018 | Pearse ............... | G01S 19/23 |
| 2011/0109506 A1 * | 5/2011 | Humphreys ........ | G01S 19/215 342/357.68 |

* cited by examiner

*Primary Examiner* — Quochien B Vuong
(74) *Attorney, Agent, or Firm* — Christensen O'Connor Johnson Kindness PLLC

(57) ABSTRACT

A system for calibration of a global navigation satellite system simulator, comprising a radio frequency component, a digital-to-analog conversion component, and a digital baseband component. The digital baseband component is configured to provide signals assigned to at least two sub-bands, each representing a global navigation satellite system band. The digital baseband component comprises at least one numerically controlled oscillator component that is configured to synchronize the signals assigned to the at least two sub-bands in order to provide at least two synchronized sub-bands. The digital baseband component is configured to add the signals assigned to the at least two synchronized sub-bands. Further, a method of calibrating a global navigation satellite system simulator is described.

14 Claims, 1 Drawing Sheet

SYSTEM FOR CALIBRATION OF A GLOBAL NAVIGATION SATELLITE SYSTEM SIMULATOR AS WELL AS METHOD OF CALIBRATING A GLOBAL NAVIGATION SATELLITE SYSTEM SIMULATOR

FIELD OF THE DISCLOSURE

Embodiments of the present disclosure relate generally to a system for calibration of a global navigation satellite system (GNSS) simulator. Further, embodiments of the present disclosure relate generally to a method of calibrating a global navigation satellite system (GNSS) simulator.

BACKGROUND

Global navigation satellite system (GNSS) simulators are known in the state of the art that are used to simulate communication with satellite systems in order to test devices under test for satellite communication, particularly receivers. The GNSS simulators may be used to test new standards in the field of satellite communication.

Generally, the GNSS may relate to a Global Positioning System (GPS), Global Navigation Satellite System (GLONASS), Galileo, Beidou, Satellite Based Augmentation System (SBAS) or Quasi-Zenith Satellite System (QZSS). Hence, the GNSS simulators are configured to output respective GNSS signals according to GPS, GLONASS, Galileo, Beidou, SBAS and/or QZSS.

However, the GNSS simulators have to be calibrated such that the signals generated by the respective GNSS simulator ensure proper testing of the device under test while using the respective GNSS simulator.

Systems are known that allow inter-carrier time calibration and alignment of multi-frequency GNSS signals for each GNSS sub-band separately, also called inter-channel calibration. This means that signals assigned to an individual GNSS sub-band are calibrated, but for each GNSS sub-band in a separate manner.

Hence, the known solutions cannot calibrate the GNSS simulator in such a manner that a precise testing of accurate receiver localization methods is possible, particularly on different GNSS sub-bands.

Accordingly, there is a need for a system as well as a method ensuring to calibrate a GNSS simulator such that a precise testing of accurate receiver localization methods is feasible.

SUMMARY

Embodiments of the present disclosure provide a system for calibration of a global navigation satellite system (GNSS) simulator. In an embodiment, the system comprises a radio frequency component, a digital-to-analog conversion component as well as a digital baseband component. The digital baseband component is configured to provide signals assigned to at least two sub-bands. The sub-bands each represent a global navigation satellite system band. The digital baseband component comprises at least one numerically controlled oscillator component that is configured to synchronize the signals assigned to the at least two sub-bands in order to provide at least two synchronized sub-bands. The digital baseband component is configured to add the signals assigned to the at least two synchronized sub-bands.

Further, embodiments of the present disclosure provide a method of calibrating a global navigation satellite system (GNSS) simulator, with the following steps:

Generating signals in at least two different sub-bands representing global navigation satellite system bands, Synchronizing the signals assigned to the at least two different sub-bands in order to provide at least two synchronized sub-bands, and Adding the signals assigned to the at least two synchronized sub-bands.

Accordingly, the present disclosure provides a single digital baseband component that generates the signal components of the several sub-bands, namely multiple simultaneous frequency bands. The different sub-bands are synchronized with each other in time by means of the at least one numerically controlled oscillator component yielding synchronized sub-bands. In other words, full synchronization of the carrier phase of the signal components is ensured. Hence, the signals of each sub-band are shifted to an appropriate sub-band center frequency using the numerically controlled oscillator component. Afterwards, the shifted signals assigned to the different sub-bands are added digitally.

In at least one subsequent step or in at least one subsequent signal processing component, an analog modulation and generation of the radio frequency signal takes place. The radio frequency signal generated may be outputted via the radio frequency component or rather an antenna assigned thereto.

For example, the signals assigned to each sub-band may be shifted to an appropriate sub-band center frequency with respect to the specific sub-band by the numerically controlled oscillator component.

Generally, time and phase alignment for multi-frequency GNSS signal generation is ensured by the system and the method according to the present disclosure.

Further, the at least global navigation satellite system (GNSS) bands represented by the at least two different sub-bands that are synchronized may relate to L bands such as L1 (1575.42 MHz), L2 (1227.60 MHz), L3 (1381.05 MHz) or L5 (1176.45 MHz).

An aspect provides that the at least two sub-bands correspond to separate frequency bands. As mentioned above, the sub-bands may relate to different L bands. Thus, signals assigned to different frequency bands may be processed simultaneously by the digital baseband component. In some embodiments, the respective signals or rather sub-bands are synchronized with each other resulting in a time and phase alignment.

Another aspect provides that the numerically controlled oscillator component is configured to correct the phase of the signals assigned to the at least two sub-bands. By synchronizing the signals assigned to the respective sub-bands, the phase of those signals is corrected with respect to each other.

Accordingly, the numerically controlled oscillator component ensures that the signals assigned to the respective sub-band are shifted to an appropriate sub-band center frequency with respect to the specific sub-band. Simultaneously, the numerically controlled oscillator component aligns the signals assigned to the respective sub-band in time and phase.

Moreover, the numerically controlled oscillator component may be configured to provide a phase coherence between the signals assigned to the at least two sub-bands. Accordingly, time and phase alignment of the multi-frequency GNSS signals provided on different GNSS sub-bands is enabled. Put differently, lower inter-frequency phase and time bias for the GNSS simulator is ensured.

According to another aspect, the digital baseband component comprises an adder that is configured to add the signals assigned to the at least two synchronized sub-bands. The respective signals generated are synchronized and then they are forwarded to the adder that digitally adds the respective signals to a common signal for further processing.

In some embodiments, the adder is located downstream of the at least one numerically controlled oscillator component. This ensures that the adder receives the signals already corrected in phase, as they have been processed by the numerically controlled oscillator component previously.

The adder may be provided by the digital baseband component, for example, as a final signal processing member of the digital baseband component.

Further, the adder may be connected to the digital-to-analog conversion component. Thus, the single digital signal obtained by the adder is converted by the digital-to-analog conversion component into an analog signal. For instance, a digital-to-analog converter is provided, which has an anti-aliasing filter for minimizing distortion artifacts.

Furthermore, the radio frequency component may be connected to the digital-to-analog conversion component that in turn is connected to the at least one numerically controlled oscillator component. The analog signal provided by the digital-to-analog conversion component is (directly) forwarded to the radio frequency component via which the analog signal is transmitted. The analog signal may be a radio frequency signal (RF signal) that is used for testing a device under test, for example a receiver.

According to another aspect, the numerically controlled oscillator component comprises several numerically controlled oscillators, each numerically controlled oscillator being assigned to a respective sub-band of the at least two sub-bands. Thus, the signals provided or rather processed within the respective sub-bands can be phase-shifted with respect to each other, as each signal is processed by a dedicated numerically controlled oscillator. Hence, phase correction of the several signals assigned to the different sub-bands can be ensured resulting in a phase coherence of these signals.

In addition, the digital baseband component may comprise at least two channel banks, each channel bank being assigned to one respective sub-band. The channel banks may generally be configured to process several different signals wherein these different signals have in common that they relate to the same sub-band, namely the same GNSS sub-band.

For instance, each channel bank is assigned to at least two satellite vehicles. In general, several different satellite vehicles may communicate via a common sub-band, which has to be tested. Therefore, each channel bank may be used to simulate at least two different satellite vehicles that, therefore, communicate via a shared sub-band. Put differently, different satellite vehicles are simulated to communicate simultaneously via the respective sub-band while providing signals assigned to the same sub-band.

The signals of the different satellite vehicles may be time aligned within the respective channel bank, namely the respective sub-band, so as to obtain a single signal assigned to the respective sub-band. This is also called inter-carrier time calibration and alignment, as the signals assigned to each individual GNSS sub-band are calibrated in time, but for each GNSS sub-band separately.

Generally, the global navigation satellite system simulator is configured to simulate communication signals by means of global navigation satellite system techniques. Thus, the system for calibrating the GNSS system is used to time and phase align the GNSS simulator for multi-frequency GNSS signal generation used for simulating simultaneous transmission on different frequency bands.

Moreover, the system for calibration of the global navigation satellite system simulator may be implemented by the global navigation satellite system simulator itself.

In an embodiment, a digital baseband component for calibration of a global navigation satellite system (GNSS) simulator calibration system is also provided.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
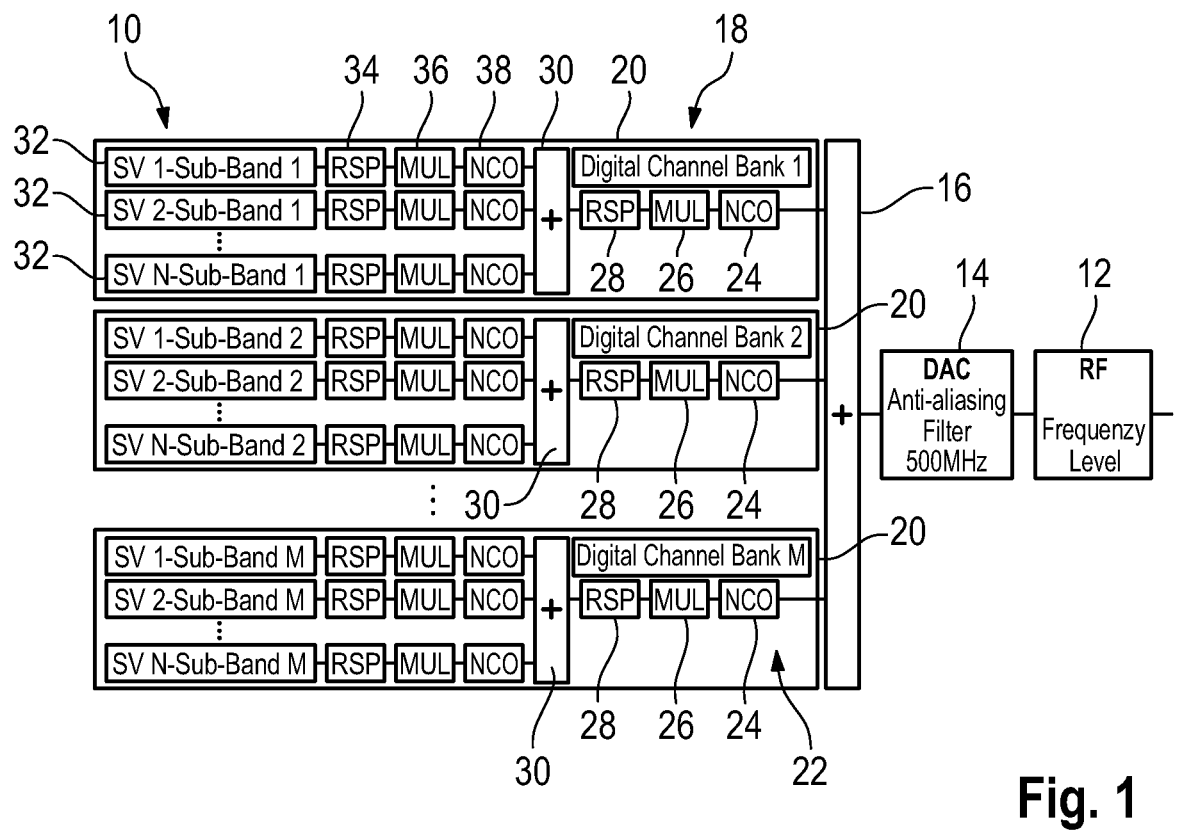
FIG. 1 schematically shows an overview of a representative system for calibration of a global navigation satellite system simulator according to the present disclosure.

In FIG. 1, a system 10 is shown that can be used for calibrating a global navigation satellite system simulator. The system 10 comprises a radio frequency component 12 that is connected to a digital-to-analog conversion component 14, which comprises a digital-to-analog converter, and an anti-aliasing filter in some embodiments.

The digital-to-analog conversion component 14 is connected with an adder 16 that is assigned to a digital baseband component 18. The digital baseband component 18 comprises several channel banks 20, namely digital channel banks, for processing signals that are forwarded to the radio frequency component 12 via the digital-to-analog conversion component 14 and the adder 16. In the shown embodiment, the digital baseband component 18 has M channel banks 20 that are connected to the adder 16.

Generally, the digital baseband component 18 provides different signals which are assigned to different sub-bands that represent global navigation satellite system (GNSS) bands, for instance L-bands such as L1, L2, L3 and/or L5 bands used for satellite navigation. These sub-bands are assigned to the channel banks 20, respectively. Put differently, each sub-band is assigned to a corresponding channel bank 20.

Further, the digital baseband component 18 comprises at least one numerically controlled oscillator component 22 that comprises several numerically controlled oscillators 24, each of which is assigned to a respective channel bank 20 or rather GNSS sub-band. In general, the at least one numerically controlled oscillator component 24 is configured to synchronize the different signals assigned to the sub-bands in order to provide synchronized sub-bands or rather synchronized signals assigned to the sub-bands. The respective signals are forwarded to the adder 16.

Accordingly, the adder 16 receives several synchronized signals assigned to different sub-bands, which are aligned in time and phase by the numerically controlled oscillator component 22 shifting the phase of the respective signals processed by the respective channel banks 20. Thus, a phase correction between the respective signals processed is ensured due to the numerically controlled oscillator component 22.

In the embodiment shown in FIG. 1, each of the digital channel banks 20 also comprises an amplitude multiplier 26 as well as a resampling module 28 that are connected in series with the respective numerically controlled oscillator 24. Each of the channel banks 20 may also comprise an internal adder 30 that is located upstream of the respective resampling module 28.

Each of the internal adders 30 is assigned to different signal sources 32, which are related to the respective sub-band handled by the respective channel bank 18 or rather sub-band, but different satellite vehicles. For example, the different signal sources 32 are simulated signal sources, as the digital baseband component 18 generates the respective signals, as will be described later with reference to FIG. 2.

In the shown embodiment of FIG. 1, each of the channel banks 20 is assigned to N different satellite vehicles, which may communicate via each of the M channel banks 20. For example, within a certain sub-band, the different signals provided by the different satellite vehicles are, for example, resampled by internal resampling modules 34, processed by internal amplitude multipliers 36 and corrected in phase by internal numerically controlled oscillators 38. Hence, synchronized signals assigned to a common sub-band, namely the respective channel bank 20, are forwarded to the internal adder 30 of each channel bank 20 or rather sub-band. This is also known as inter-carrier time calibration.

The internal adders 30 each output a single signal that relates to the respective sub-band, which is processed by the resampling module 28 and the amplitude multiplier 26 prior to being forwarded to the numerically controlled oscillator 24 of the respective numerically controlled oscillator component 22 as described above. The numerically controlled oscillator component 22 ensures that the respective signals assigned to the different sub-bands or rather the different channel banks 20 are aligned in time and phase so that corrected signals assigned to the different sub-band are forwarded to the adder 16.

Figure 2:
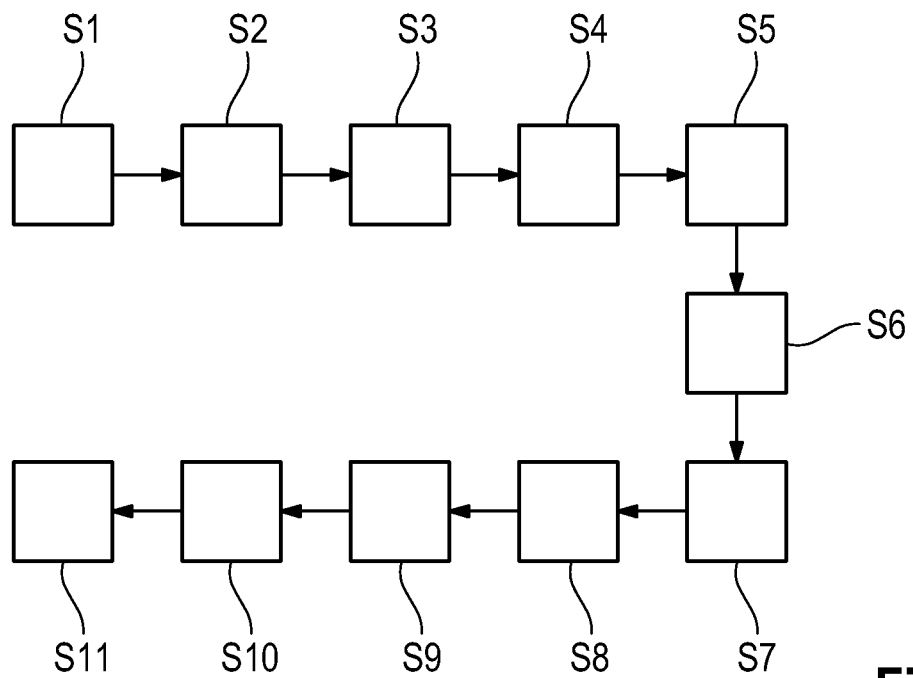
FIG. 2 shows a flow-chart illustrating a representative method of calibrating a global navigation satellite system simulator according to the present disclosure.

With reference to FIG. 2, the system 10 generates signals assigned to different sub-bands and satellite vehicles in a first step S1. The respective signals are provided by the signal sources 32 shown in FIG. 1, wherein each channel bank 20 is assigned to several signal sources 32 that have in common that they relate to a common sub-band, namely the one assigned to the respective channel bank 20.

For example, the number of signal sources 32 per channel bank 20 relates to the number of different satellite vehicles that shall be simulated. In the shown embodiment of FIG. 1, N different satellite vehicles can be simulated.

In a second step S2, the respective signals provided are resampled by internal resampling modules 34 assigned to each signal source 32.

In a third step S3, the respective resampled signals are processed by the internal amplitude multipliers 36, each of which is assigned to a respective signal source 32. For example, each resampling module 34 is connected with an internal amplitude multiplier 36 located downstream of the respective resampling module 34.

In a fourth step S4, the signals resampled and processed by the internal amplitude multipliers 36 are synchronized with each other per channel bank 20 by the internal numerically controlled oscillators 38. This corresponds to the inter-carrier time calibration.

In a fifth step S5, the signals synchronized are added by the internal adder 30 per channel bank 20 in order to obtain a single signal to be processed by each channel bank 20, namely each sub-band. Accordingly, the signals assigned to the different satellite vehicles are combined by the internal adders 30 to a combined signal processed by each channel bank 20. The combined signal is assigned to a dedicated sub-band, namely a GNSS sub-band.

In a sixth step S6, the single signals outputted by each internal adder 30 are resampled by the resampling module 28.

In a seventh step S7, the resampled single signals obtained from the resampling modules 28 are processed by the respective amplitude multiplier 26.

In an eighth step S8, the signals outputted by the amplitude multipliers 26 of each channel bank 20, namely the signals assigned to different sub-bands, are synchronized in order to provide at least two synchronized sub-bands or rather synchronized signals assigned to the sub-bands. Hence, the phase of the signals assigned to the sub-bands is corrected so that a phase coherence between the signals assigned to the sub-bands is obtained. Put differently, a time and phase alignment for the multi-frequency GNSS signal generation is ensured.

In a ninth step S9, the synchronized signals assigned to each sub-band are added by the adder 16 so that a common signal is obtained.

In a tenth step S10, the common signal outputted by the adder 16 is converted by the digital-to-analog conversion component 14 yielding an analog signal.

The analog signal obtained by the digital-to-analog conversion component 14 is forwarded to the radio frequency component 12 so that a radio frequency signal is outputted in a eleventh step S11, which can be used for testing the device under test with respect to satellite communication techniques. The outputted signal can be transmitted either by cable or wirelessly. For example, in some embodiments, the RF component 12 includes an antenna or a RF transmission cable, connector or port.

Accordingly, the system 10 for calibration of the global navigation satellite system simulator as well as the method of calibrating the global navigation satellite system simulator assure time and phase alignment of the GNSS simulator.

The global navigation satellite system simulator can be calibrated such that the GNSS simulator can be used for precise testing of accurate receiver localization methods that include multi-frequency GNSS signals and require time and/or phase alignment on different GNSS sub-bands, such as L1, L2, L3 and/or L5.

The system 10 and the method allow phase coherence or rather alignment of multi-frequency GNSS signals in the different GNSS sub-bands and, thus, ensuring lower inter-frequency phase and time bias of the GNSS simulator.

It will be understood that one or more of the components, such as the digital-to-analog conversion component 14, the adder 16, the digital baseband component 18, etc., described above, and/or any subcomponents thereof, may include, in some embodiments, logic for implementing the technologies and methodologies described herein. This logic of one or more of these components can be carried out in either hardware or software, or a combination of hardware and software.

In an example, the functionality of one or more of these components could be implemented by special purpose hardware-based computer systems or circuits, etc., or combinations of special purpose hardware and computer instructions. In some embodiments, one or more of these components includes one or more computing devices such as a processor (e.g., a microprocessor), a central processing unit (CPU), a digital signal processor (DSP), an application-specific integrated circuit (ASIC), a field-programmable gate array (FPGA), or the like, or any combinations thereof, and can include discrete digital or analog circuit elements or electronics, or combinations thereof.

In an embodiment, one or more of these components include a microprocessor and a memory storing logic modules and/or instructions. In an embodiment, one or more of these components include one or more ASICs having a plurality of predefined logic components. In an embodiment, the one or more modules include one or more FPGA having a plurality of programmable logic components. In an embodiment, one or more of these components includes combinations of circuits and computer program products having software or firmware instructions stored on one or more computer readable memories that work together to cause a device to perform one or more methodologies or technologies described herein. In an embodiment, one or more of these components includes hardware circuits (e.g., implementations in analog circuitry, implementations in digital circuitry, and the like, and combinations thereof) for carrying out the functionality described herein.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A system for calibration of a global navigation satellite system simulator, comprising:
    a radio frequency component;
    a digital-to-analog conversion component; and
    a digital baseband component comprising at least two channel banks, each channel bank being assigned to one respective sub-band,
    the digital baseband component being configured to provide signals assigned to at least two sub-bands, the sub-bands each representing a global navigation satellite system band;
    the digital baseband component comprising at least one numerically controlled oscillator component that is configured to synchronize the signals assigned to the at least two sub-bands with each other in time in order to provide at least two synchronized sub-bands; and
    the digital baseband component being configured to digitally add the signals assigned to the at least two synchronized sub-bands, wherein the signals are synchronized in time with each other such that the signals are already corrected in phase by being previously processed by the numerically controlled oscillator component.

2. The system according to claim 1, wherein the at least two sub-bands correspond to separate frequency bands.

3. The system according to claim 1, wherein the numerically controlled oscillator component is configured to provide a phase coherence between the signals assigned to the at least two sub-bands.

4. The system according to claim 1, wherein the digital baseband component comprises an adder that is configured to add the signals assigned to the at least two synchronized sub-bands.

5. The system according to claim 4, wherein the adder is located downstream of the at least one numerically controlled oscillator component.

6. The system according to claim 4, wherein the adder is connected to the digital-to-analog conversion component.

7. The system according to claim 1, wherein the radio frequency component is connected to the digital-to-analog conversion component that in turn is connected to the at least one numerically controlled oscillator component.

8. The system according to claim 1, wherein the numerically controlled oscillator component comprises several numerically controlled oscillators, each numerically controlled oscillator being assigned to a respective sub-band of the at least two sub-bands.

9. The system according to claim 1, wherein each channel bank is assigned to at least two satellite vehicles.

10. The system according to claim 1, wherein the global navigation satellite system simulator is configured to simulate communication signals by global navigation satellite system techniques.

11. A method of calibrating a global navigation satellite system simulator, comprising:
    generating signals in at least two different sub-bands representing global navigation satellite system bands, said at least two different sub-bands being assigned to at least two channel banks of a digital baseband component;
    synchronizing the signals assigned to the at least two different sub-bands with each other in time in order to provide at least two synchronized sub-bands; and
    digitally adding the signals assigned to the at least two synchronized sub-bands, wherein the signals are synchronized in time with each other such that the signals are already corrected in phase by being previously processed by the numerically controlled oscillator component.

12. The method according to claim 11, wherein a phase coherence between the signals in the at least two sub-bands is obtained.

13. The method according to claim 11, wherein signals of at least two different satellite vehicles are processed by at least one of the sub-bands.

14. A digital baseband component for a global navigation satellite system (GNSS) simulator calibration system, the digital baseband component comprising at least two channel banks, each channel bank being assigned to one respective sub-band, the digital baseband component being configured to provide signals assigned to at least two sub-bands, the sub-bands each representing a global navigation satellite system band, the digital baseband component comprising at least one numerically controlled oscillator component that is configured to synchronize the signals assigned to the at least two sub-bands with each other in time in order to provide at least two synchronized sub-bands, wherein the digital baseband component is configured to digitally add the signals assigned to the at least two synchronized sub-bands, wherein the signals are synchronized in time with each other such that the signals are already corrected in phase by being previously processed by the numerically controlled oscillator component.

* * * * *